United States Patent
Paulotto et al.

(10) Patent No.: US 11,340,329 B2
(45) Date of Patent: May 24, 2022

(54) ELECTRONIC DEVICES WITH BROADBAND RANGING CAPABILITIES

(71) Applicant: Apple Inc., Cupertino, CA (US)

(72) Inventors: Simone Paulotto, Redwood City, CA (US); Carlo Di Nallo, Belmont, CA (US)

(73) Assignee: Apple Inc., Cupertino, CA (US)

( * ) Notice: Subject to any disclaimer, the term of this patent is extended or adjusted under 35 U.S.C. 154(b) by 340 days.

(21) Appl. No.: 16/563,658

(22) Filed: Sep. 6, 2019

(65) Prior Publication Data

US 2020/0182964 A1 Jun. 11, 2020

Related U.S. Application Data

(60) Provisional application No. 62/776,968, filed on Dec. 7, 2018.

(51) Int. Cl.
  *G01S 7/03* (2006.01)
  *G01S 13/08* (2006.01)
  (Continued)

(52) U.S. Cl.
  CPC .......... *G01S 7/032* (2013.01); *G01S 13/0209* (2013.01); *G01S 13/08* (2013.01); *H01Q 5/385* (2015.01);
  (Continued)

(58) Field of Classification Search
  CPC ...... G01S 7/032; G01S 13/08; G01S 13/0209; G01S 2013/0254; G01S 13/10;
  (Continued)

(56) References Cited

U.S. PATENT DOCUMENTS

| | | | |
|---|---|---|---|
| 4,839,659 A | 6/1989 | Stern et al. | |
| 6,271,790 B2 * | 8/2001 | Smith | H04B 7/10 342/365 |

(Continued)

FOREIGN PATENT DOCUMENTS

| | | |
|---|---|---|
| CN | 1150498 A | 5/1997 |
| CN | 101019274 A | 8/2007 |

(Continued)

OTHER PUBLICATIONS

Jiawei Dong, Anguo Wang, Peng Wang and Yonghong Hou, "A novel stacked wideband microstrip patch antenna with U-shaped parasitic elements," 2008 8th International Symposium on Antennas, Propagation and EM Theory, 2008, pp. 185-188, doi: 10.1109/ISAPE.2008.4735172. (Year: 2008).*

(Continued)

*Primary Examiner* — Olumide Ajibade Akonai
(74) *Attorney, Agent, or Firm* — Treyz Law Group, P.C.; Michael H. Lyons; Tianyi He

(57) ABSTRACT

An electronic device may be provided with control circuitry and wireless circuitry. The wireless circuitry may include a phased antenna array and a radio-frequency integrated circuit having transmit and receive ports. The array may include a first set of stacked patch antennas coupled to the transmit ports and a second set of stacked patch antennas coupled to the receive ports. The integrated circuit may transmit ranging signals at millimeter wave frequencies using the transmit ports and the first set of antennas. The integrated circuit may receive a reflected version of the transmitted ranging signals that has been reflected off of an external object using the receive ports and the second set of antennas. The control circuitry may identify a distance between the electronic device and the external object based on the transmitted and received signals.

18 Claims, 10 Drawing Sheets

(51) Int. Cl.
*G01S 13/02* (2006.01)
*H01Q 5/385* (2015.01)
*H01Q 21/06* (2006.01)

(52) U.S. Cl.
CPC .... *G01S 2013/0254* (2013.01); *H01Q 21/065* (2013.01)

(58) Field of Classification Search
CPC ........ G01S 13/26; G01S 13/66; G01S 13/931; G01S 13/003; G01S 7/006; G01S 7/03; G01S 13/4463; G01S 7/282; G01S 7/352; G01S 2013/0245; H01Q 1/22; H01Q 1/225; H01Q 1/38; H01Q 1/48; H01Q 1/50; H01Q 21/0006; H01Q 21/065; H01Q 21/08; H01Q 21/0025; H01Q 21/24; H01Q 9/0407; H01Q 1/2283; H01Q 1/523; H01Q 1/247; H01Q 1/46; H01Q 5/335; H01Q 1/243; H01Q 19/005; H01Q 5/385; H04B 7/0413; H04B 1/38; H04B 1/16
See application file for complete search history.

(56) References Cited

U.S. PATENT DOCUMENTS

| | | | | |
|---|---|---|---|---|
| 6,600,776 | B1* | 7/2003 | Alamouti | H04B 7/10 375/150 |
| 7,436,363 | B1* | 10/2008 | Klein | H01Q 5/00 343/757 |
| 8,170,498 | B2* | 5/2012 | Rofougaran | H01Q 1/2283 455/562.1 |
| 9,306,291 | B2* | 4/2016 | Lu | H01Q 21/00 |
| 10,396,470 | B1 | 8/2019 | Rashidian | |
| 2005/0156780 | A1* | 7/2005 | Bonthron | G01S 3/48 342/134 |
| 2006/0267830 | A1 | 11/2006 | O'Boyle | |
| 2007/0052592 | A1 | 3/2007 | Purden et al. | |
| 2015/0253420 | A1 | 9/2015 | Alland | |
| 2016/0033632 | A1 | 2/2016 | Searcy et al. | |
| 2016/0306034 | A1* | 10/2016 | Trotta | G01S 13/34 |
| 2018/0013208 | A1* | 1/2018 | Izadian | H01P 11/002 |
| 2018/0041241 | A1 | 2/2018 | Trotta et al. | |
| 2018/0074173 | A1* | 3/2018 | Trotta | G01S 13/584 |
| 2018/0090852 | A1* | 3/2018 | Dufilie | H01Q 1/38 |
| 2018/0180713 | A1* | 6/2018 | Cohen | G01S 13/32 |
| 2018/0341005 | A1 | 11/2018 | Yoo | |
| 2019/0081395 | A1 | 3/2019 | Daniel | |
| 2019/0115664 | A1* | 4/2019 | Veihl | H01Q 5/385 |
| 2019/0140344 | A1* | 5/2019 | Kirino | H01P 3/123 |
| 2019/0198999 | A1 | 6/2019 | Ashrafi | |
| 2019/0363453 | A1* | 11/2019 | Yu | H01Q 21/062 |
| 2020/0021008 | A1* | 1/2020 | Yong | H01Q 21/005 |
| 2020/0076395 | A1* | 3/2020 | Kamo | H01P 5/12 |
| 2020/0106183 | A1* | 4/2020 | Fabrega Sanchez | H04B 1/0458 |
| 2020/0116850 | A1* | 4/2020 | Santra | G01S 13/449 |

FOREIGN PATENT DOCUMENTS

| | | |
|---|---|---|
| CN | 102025026 A | 4/2011 |
| CN | 105789870 A | 7/2016 |
| CN | 108196255 A | 6/2018 |
| CN | 108417999 A | 8/2018 |
| JP | 2006013831 A | 1/2006 |
| JP | 2007282201 A | 10/2007 |
| JP | 2011526371 A | 10/2011 |
| JP | 2012105072 A | 5/2012 |
| JP | 2014190720 A | 10/2014 |
| JP | 2014530343 A | 11/2014 |
| JP | 2016166859 A | 9/2016 |
| JP | 2017505900 A | 2/2017 |
| KR | 20050060947 A | 6/2005 |
| KR | 20070066886 A | 6/2007 |
| KR | 20140041939 A | 4/2014 |
| KR | 1020140063720 A | 5/2014 |
| WO | 2016063759 A1 | 4/2016 |

OTHER PUBLICATIONS

Moallem, Meysam, A Micromachined Millimeter-Wave Radar Technology for Indoor Navigation, https://deepblue.lib.umich.edu/bitstream/handle/2027.42/107273/moallem_1.pdf?sequence=1&isAllowed=y (2014).

Hasch, Jürgen et al., Millimeter-wave technology for automotive radar sensors in the 77 GHz frequency band IEEE Transactions on Microwave Theory and Techniques 60.3 (2012): 845-860.

\* cited by examiner

ELECTRONIC DEVICES WITH BROADBAND RANGING CAPABILITIES

This application claims the benefit of provisional patent application No. 62/776,968, filed Dec. 7, 2018, which is hereby incorporated by reference herein in its entirety.

BACKGROUND

This relates generally to electronic devices and, more particularly, to electronic devices with wireless circuitry.

Electronic devices often include wireless circuitry. For example, cellular telephones, computers, and other devices often contain antennas and wireless transceivers for supporting wireless communications. Electronic devices also often include wireless circuitry for performing spatial ranging operations in which transmitted and reflected radio-frequency signals are used to identify a distance between the electronic device and an external object.

It may be desirable to support spatial ranging operations at millimeter and centimeter wave frequencies between 10 GHz and 300 GHz. However, if care is not taken, the wireless circuitry will exhibit insufficient bandwidth for performing satisfactory spatial ranging operations at these frequencies.

It would therefore be desirable to be able to provide electronic devices with wireless circuitry that supports millimeter and centimeter wave spatial ranging operations at relatively high bandwidths.

SUMMARY

An electronic device may be provided with control circuitry and wireless circuitry. The wireless circuitry and the control circuitry may perform spatial ranging operations using a multiple-input and multiple-output (MIMO) radio detection and ranging (RADAR) scheme.

The wireless circuitry may include a radio-frequency integrated circuit having transmit ports and receive ports. Millimeter and centimeter wave transceiver circuitry may be formed on the radio-frequency integrated circuit. Phase and magnitude controllers may be coupled to each of the transmit and receive ports. The wireless circuitry may include a phased antenna array coupled to the radio-frequency integrated circuit.

The phased antenna array may include a first set of stacked patch antennas coupled to the transmit ports and a second set of stacked patch antennas coupled to the receive ports. The first and second sets of stacked patch antennas may be formed in a single row of the phased antenna array or may each include columns of multiple, in phase, stacked patch antennas for narrowing a beam width generated by the phased antenna array.

The radio-frequency integrated circuit may transmit radio-frequency ranging signals at millimeter wave frequencies using the transmit ports and the first set of stacked patch antennas. The radio-frequency integrated circuit may receive a reflected version of the transmitted radio-frequency ranging signals that has been reflected off of an external object using the receive ports and the second set of stacked patch antennas. The control circuitry may identify a distance between the electronic device and the external object based on the transmitted and received signals. The first and second sets of stacked patch antennas may configure the phased antenna array to support relatively wide bandwidths such as bandwidths greater than 1 GHz. This may allow the electronic device to perform the spatial ranging operations over a relatively wide range of frequencies such as frequencies from 57 GHz to 61 GHz.

DETAILED DESCRIPTION

Figure 1:
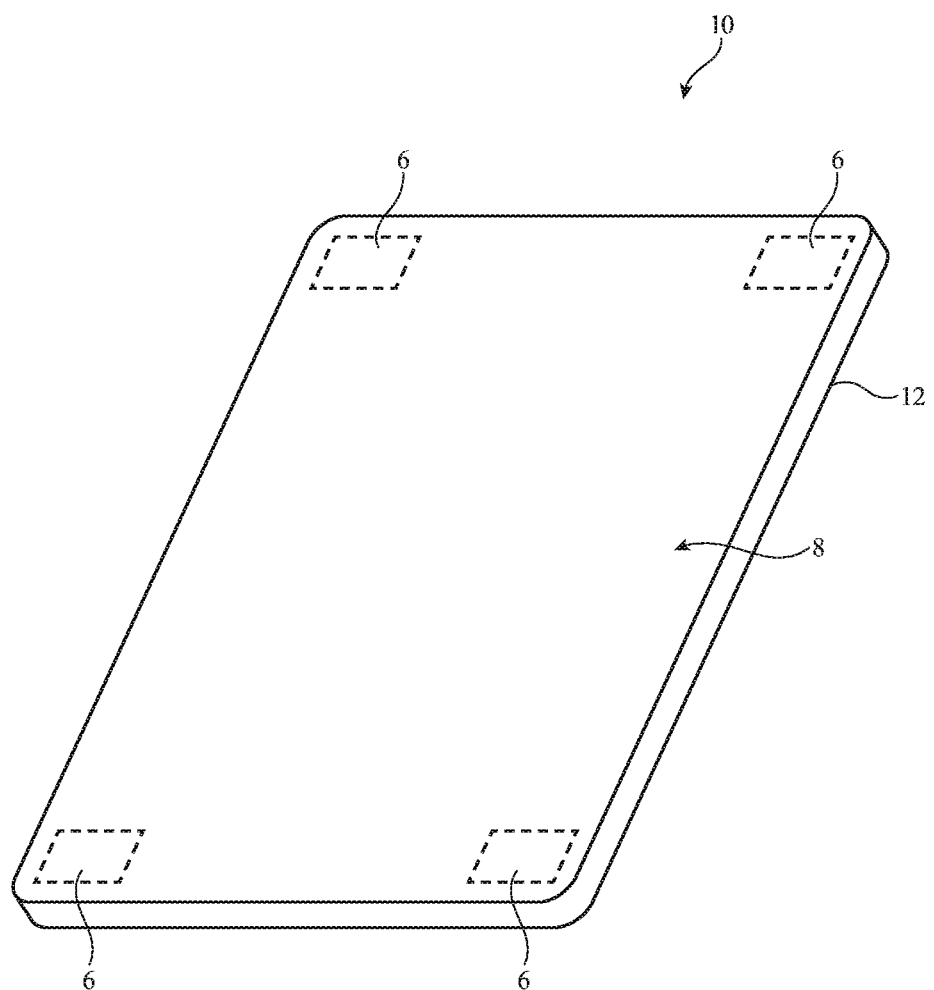
FIG. 1 is a perspective view of an illustrative electronic device with wireless circuitry in accordance with some embodiments.

An electronic device such as electronic device 10 of FIG. 1 may contain wireless circuitry. The wireless circuitry may include one or more antennas. The antennas may include phased antenna arrays that are used for performing wireless communications and/or spatial ranging operations using millimeter and centimeter wave signals. Millimeter wave signals, which are sometimes referred to as extremely high frequency (EHF) signals, propagate at frequencies above about 30 GHz (e.g., at 60 GHz or other frequencies between about 30 GHz and 300 GHz). Centimeter wave signals propagate at frequencies between about 10 GHz and 30 GHz. If desired, device 10 may also contain antennas for handling satellite navigation system signals, cellular telephone signals, local wireless area network signals, near-field communications, light-based wireless communications, or other wireless communications.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a virtual or augmented reality headset device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless access point or base station, a desktop computer, a portable speaker, a keyboard, a gaming controller, a gaming system, a computer mouse, a mousepad, a trackpad or touchpad, equipment that implements the functionality of two or more of these devices, or other electronic equipment. In the illustrative configuration of FIG. 1, device 10 is a portable device such as a cellular telephone, media player, tablet computer, portable speaker, or other portable computing device. Other configurations may be used for device 10 if desired. The example of FIG. 1 is merely illustrative.

As shown in FIG. 1, device 10 may include a display such as display 8. Display 8 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 8 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch sensor electrodes may be formed from an array of indium tin oxide pads or other transparent conductive structures.

Display 8 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 8 may be protected using a display cover layer such as a layer of transparent glass, clear plastic, sapphire, or other transparent dielectric. Openings may be formed in the display cover layer. For example, openings may be formed in the display cover layer to accommodate one or more buttons, sensor circuitry such as a fingerprint sensor or light sensor, ports such as a speaker port or microphone port, etc. Openings may be formed in housing 12 to form communications ports (e.g., an audio jack port, a digital data port, charging port, etc.). Openings in housing 12 may also be formed for audio components such as a speaker and/or a microphone.

Antennas may be mounted in housing 12. If desired, some of the antennas (e.g., antenna arrays that implement beam steering, etc.) may be mounted under an inactive border region of display 8 (see, e.g., illustrative antenna locations 6 of FIG. 1). Display 8 may contain an active area with an array of pixels (e.g., a central rectangular portion). Inactive areas of display 8 are free of pixels and may form borders for the active area. If desired, antennas may also operate through dielectric-filled openings in the rear of housing 12 or elsewhere in device 10.

To avoid disrupting communications when an external object such as a human hand or other body part of a user blocks one or more antennas, antennas may be mounted at multiple locations in housing 12. Sensor data such as proximity sensor data, real-time antenna impedance measurements, signal quality measurements such as received signal strength information, and other data may be used in determining when one or more antennas is being adversely affected due to the orientation of housing 12, blockage by a user's hand or other external object, or other environmental factors. Device 10 can then switch one or more replacement antennas into use in place of the antennas that are being adversely affected.

Antennas may be mounted at the corners of housing 12 (e.g., in corner locations 6 of FIG. 1 and/or in corner locations on the rear of housing 12), along the peripheral edges of housing 12, on the rear of housing 12, under the display cover glass or other dielectric display cover layer that is used in covering and protecting display 8 on the front of device 10, under a dielectric window on a rear face of housing 12 or the edge of housing 12, or elsewhere in device 10.

Figure 2:
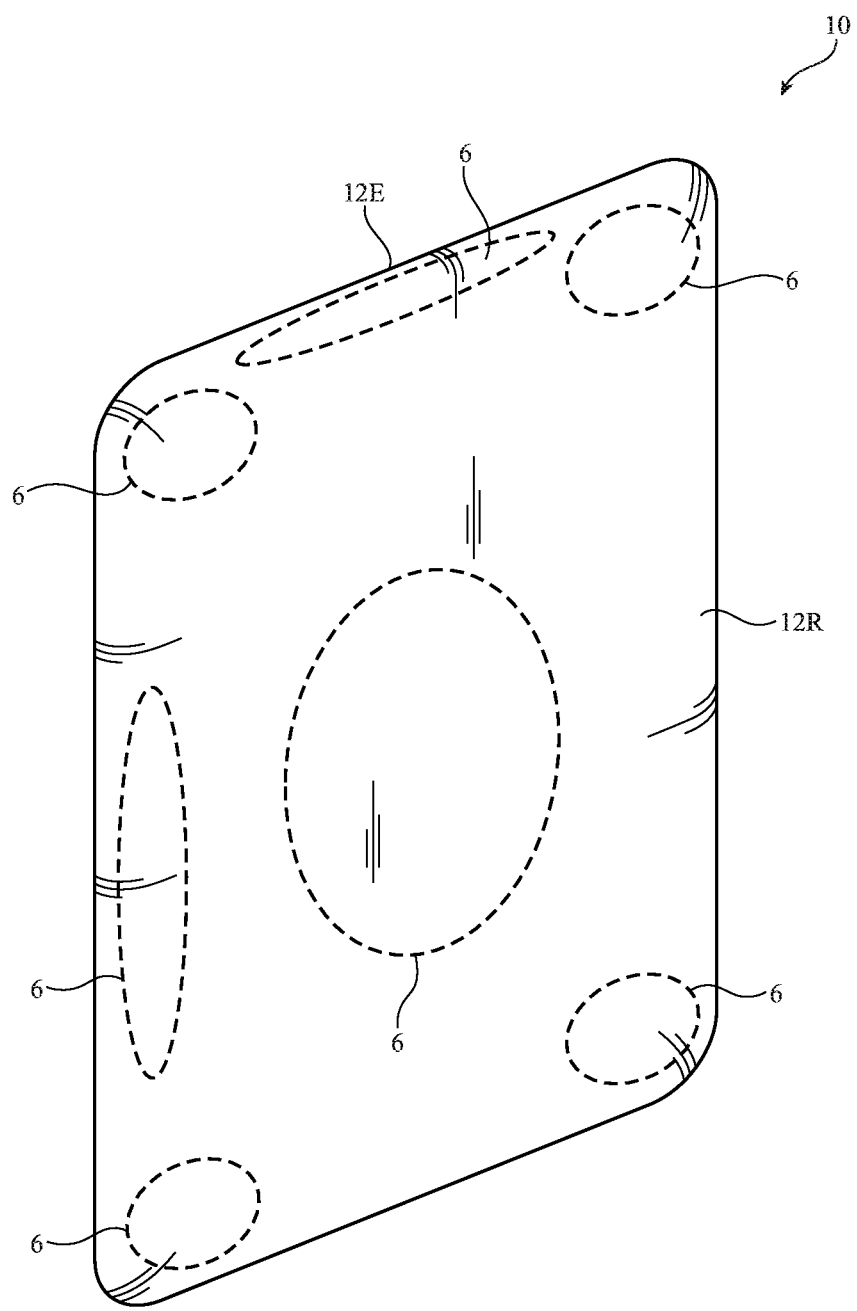
FIG. 2 is a rear perspective view of an illustrative electronic device with wireless circuitry in accordance with some embodiments.

FIG. 2 is a rear perspective view of electronic device 10 showing illustrative locations 6 on the rear and sides of housing 12 in which antennas (e.g., single antennas and/or phased antenna arrays) may be mounted in device 10. The antennas may be mounted at the corners of device 10, along the edges of housing 12 such as edges formed by sidewalls 12E, on upper and lower portions of rear housing wall 12R, in the center of rear housing wall 12R (e.g., under a dielectric window structure or other antenna window in the center of rear housing wall 12R), at the corners of rear housing wall 12R (e.g., on the upper left corner, upper right corner, lower left corner, and lower right corner of the rear of housing 12 and device 10), etc.

In configurations in which housing 12 is formed entirely or nearly entirely from a dielectric (e.g., plastic, glass, sapphire, ceramic, fabric, etc.), the antennas may transmit and receive antenna signals through any suitable portion of the dielectric. In configurations in which housing 12 is formed from a conductive material such as metal, regions of the housing such as slots or other openings in the metal may be filled with plastic or other dielectric. The antennas may be mounted in alignment with the dielectric in the openings. These openings, which may sometimes be referred to as dielectric antenna windows, dielectric gaps, dielectric-filled openings, dielectric-filled slots, elongated dielectric opening regions, etc., may allow antenna signals to be transmitted to external wireless equipment from the antennas mounted within the interior of device 10 and may allow internal antennas to receive antenna signals from external wireless equipment. In another suitable arrangement, the antennas may be mounted on the exterior of conductive portions of housing 12.

FIGS. 1 and 2 are merely illustrative. In general, housing 12 may have any desired shape (e.g., a rectangular shape, a cylindrical shape, a spherical shape, combinations of these, etc.). Display 8 of FIG. 1 may be omitted if desired. Antennas may be located within housing 12, on housing 12, and/or external to housing 12.

Figure 3:
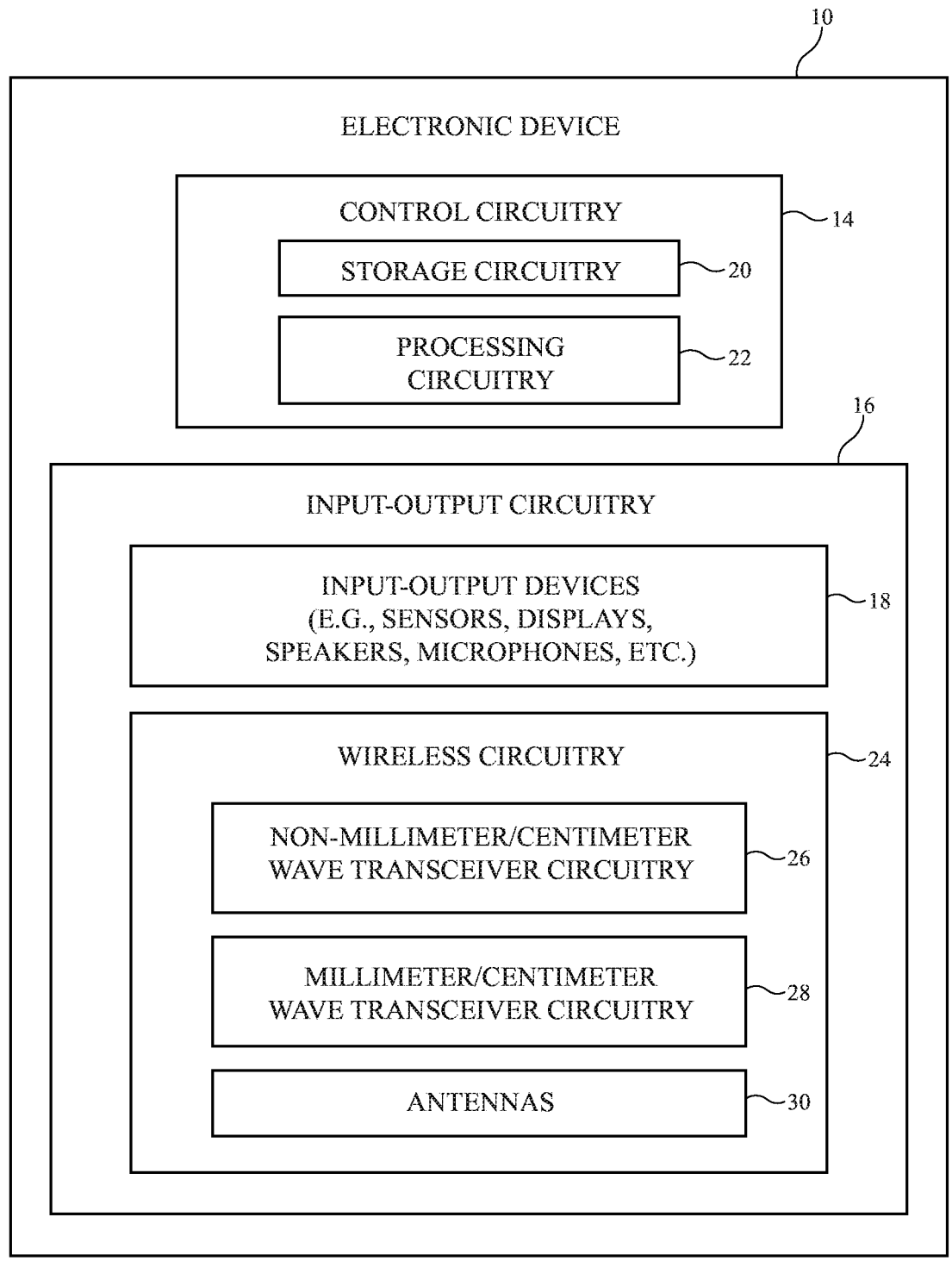
FIG. 3 is a schematic diagram of an illustrative electronic device with wireless circuitry in accordance with some embodiments.

A schematic diagram of illustrative components that may be used in device 10 is shown in FIG. 3. As shown in FIG. 3, device 10 may include control circuitry 14. Control circuitry 14 may include storage such as storage circuitry 20. Storage circuitry 20 may include hard disk drive storage, nonvolatile memory (e.g., flash memory or other electrically-programmable-read-only memory configured to form a solid-state drive), volatile memory (e.g., static or dynamic random-access-memory), etc. Control circuitry 14 may include processing circuitry such as processing circuitry 22. Processing circuitry 22 may be used to control the operation of device 10. Processing circuitry 22 may include on one or more microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 20 (e.g., storage circuitry 20 may include non-transitory (tangible) computer readable storage media that stores the software code). The software code may sometimes be referred to as program instructions, software, data, instructions, or code. Software code stored on storage circuitry 20 may be executed by processing circuitry 22.

Control circuitry 14 may be used to run software on device 10 such as internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 16. Input-output circuitry 16 may include input-output devices 18. Input-output devices 18 may be used to allow data to be supplied to device 10 and to allow data to be provided from device 10 to external devices. Input-output devices 18 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 16 may include wireless circuitry such as wireless circuitry 24 for wirelessly conveying radio-frequency signals. While control circuitry 14 is shown separately from wireless circuitry 24 in the example of FIG. 3 for the sake of clarity, wireless circuitry 24 may include processing circuitry that forms a part of processing circuitry 22 and/or storage circuitry that forms a part of storage circuitry 20 of control circuitry 14 (e.g., portions of control circuitry 14 may be implemented on wireless circuitry 24). As an example, control circuitry 14 may include baseband processor circuitry or other control components that form a part of wireless circuitry 24.

Wireless circuitry 24 may include millimeter and centimeter wave transceiver circuitry such as millimeter/centimeter wave transceiver circuitry 28. Millimeter/centimeter wave transceiver circuitry 28 may support communications at frequencies between about 10 GHz and 300 GHz. For example, millimeter/centimeter wave transceiver circuitry 28 may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, millimeter/centimeter wave transceiver circuitry 28 may support communications in an IEEE K communications band between about 18 GHz and 27 GHz, a $K_a$ communications band between about 26.5 GHz and 40 GHz, a $K_u$ communications band between about 12 GHz and 18 GHz, a V communications band between about 40 GHz and 75 GHz, a W communications band between about 75 GHz and 110 GHz, or any other desired frequency band between approximately 10 GHz and 300 GHz. If desired, millimeter/centimeter wave transceiver circuitry 28 may support IEEE 802.11ad communications at 60 GHz and/or $5^{th}$ generation mobile networks or $5^{th}$ generation wireless systems (5G) communications bands between 27 GHz and 90 GHz. Millimeter/centimeter wave transceiver circuitry 28 may be formed from one or more integrated circuits (e.g., multiple integrated circuits mounted on a common printed circuit in a system-in-package device, one or more integrated circuits mounted on different substrates, etc.).

Millimeter/centimeter wave transceiver circuitry 28 (sometimes referred to herein simply as transceiver circuitry 28 or millimeter/centimeter wave circuitry 28) may perform spatial ranging operations using radio-frequency signals at millimeter and/or centimeter wave signals that are transmitted and received by millimeter/centimeter wave transceiver circuitry 28. The received signals may be a version of the transmitted signals that have been reflected off of external objects and back towards device 10. Control circuitry 14 may process the transmitted and received signals to detect or estimate a range between device 10 and one or more external objects in the surroundings of device 10 (e.g., objects external to device 10 such as the body of a user or other persons, other devices, animals, furniture, walls, or other objects or obstacles in the vicinity of device 10). If desired, control circuitry 14 may also process the transmitted and received signals to identify a two or three-dimensional spatial location of the external objects relative to device 10.

Spatial ranging operations performed by millimeter/centimeter wave transceiver circuitry 28 are unidirectional. If desired, millimeter/centimeter wave transceiver circuitry 28 may also perform bidirectional communications with external wireless equipment. Bidirectional communications involve both the transmission of wireless data by millimeter/centimeter wave transceiver circuitry 28 and the reception of wireless data that has been transmitted by external wireless equipment. The wireless data may, for example, include data that has been encoded into corresponding data packets such as wireless data associated with a telephone call, streaming media content, internet browsing, wireless data associated with software applications running on device 10, email messages, etc.

If desired, wireless circuitry 24 may include transceiver circuitry for handling communications at frequencies below 10 GHz such as non-millimeter/centimeter wave transceiver circuitry 26. Non-millimeter/centimeter wave transceiver circuitry 26 may include wireless local area network (WLAN) transceiver circuitry that handles 2.4 GHz and 5 GHz bands for Wi-Fi® (IEEE 802.11) communications, wireless personal area network (WPAN) transceiver circuitry that handles the 2.4 GHz Bluetooth® communications band, cellular telephone transceiver circuitry that handles cellular telephone communications bands from 700 to 960 MHz, 1710 to 2170 MHz, 2300 to 2700 MHz, and/or or any other desired cellular telephone communications bands between 600 MHz and 4000 MHz, GPS receiver circuitry that receives GPS signals at 1575 MHz or signals for handling other satellite positioning data (e.g., GLONASS signals at 1609 MHz), television receiver circuitry, AM/FM radio receiver circuitry, paging system transceiver circuitry, near field communications (NFC) circuitry, etc. Non-millimeter/centimeter wave transceiver circuitry 26 and millimeter/centimeter wave transceiver circuitry 28 may each include one or more integrated circuits, power amplifier circuitry, low-noise input amplifiers, passive radio-frequency components, switching circuitry, transmission line structures, and other circuitry for handling radio-frequency signals.

Wireless circuitry 24 may include antennas 30. Non-millimeter/centimeter wave transceiver circuitry 26 may transmit and receive radio-frequency signals below 10 GHz using one or more antennas 30. Millimeter/centimeter wave transceiver circuitry 28 may transmit and receive radio-frequency signals above 10 GHz (e.g., at millimeter wave and/or centimeter wave frequencies) using antennas 30.

In satellite navigation system links, cellular telephone links, and other long-range links, radio-frequency signals are typically used to convey data over thousands of feet or miles. In Wi-Fi® and Bluetooth® links at 2.4 and 5 GHz and other short-range wireless links, radio-frequency signals are typically used to convey data over tens or hundreds of feet. Millimeter/centimeter wave transceiver circuitry 28 may convey radio-frequency signals over short distances that travel over a line-of-sight path. To enhance signal reception for millimeter and centimeter wave communications, phased antenna arrays and beam steering techniques may be used (e.g., schemes in which antenna signal phase and/or magnitude for each antenna in an array are adjusted to perform beam steering). Antenna diversity schemes may also be used to ensure that the antennas that have become blocked or that are otherwise degraded due to the operating environment of device 10 can be switched out of use and higher-performing antennas used in their place.

Antennas 30 in wireless circuitry 24 may be formed using any suitable antenna types. For example, antennas 30 may include antennas with resonating elements that are formed from stacked patch antenna structures, loop antenna structures, patch antenna structures, inverted-F antenna structures, slot antenna structures, planar inverted-F antenna structures, monopole antenna structures, dipole antenna structures, helical antenna structures, Yagi (Yagi-Uda) antenna structures, hybrids of these designs, etc. If desired, one or more of antennas 30 may be cavity-backed antennas. Different types of antennas may be used for different bands and combinations of bands. For example, one type of antenna may be used in forming a non-millimeter/centimeter wave wireless link for non-millimeter/centimeter wave transceiver circuitry 26 and another type of antenna may be used in conveying radio-frequency signals at millimeter and/or centimeter wave frequencies for millimeter/centimeter wave transceiver circuitry 28. Antennas 30 that are used to convey radio-frequency signals at millimeter and centimeter wave frequencies may be arranged in one or more phased antenna arrays.

Figure 4:
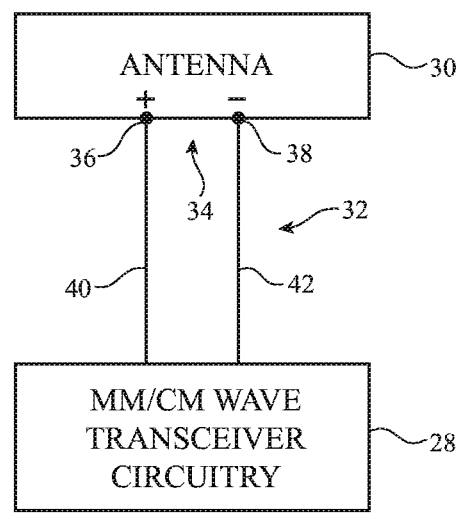
FIG. 4 is a schematic diagram showing how illustrative millimeter and centimeter wave transceiver circuitry may be coupled to an antenna using a radio-frequency transmission line in accordance with some embodiments.

A schematic diagram of an antenna 30 that may be formed in a phased antenna array for conveying radio-frequency signals at millimeter and centimeter wave frequencies is shown in FIG. 4. As shown in FIG. 4, antenna 30 may be coupled to millimeter/centimeter (MM/CM) wave transceiver circuitry 28. Millimeter/centimeter wave transceiver circuitry 28 may be coupled to antenna feed 34 of antenna 30 using a transmission line path that includes radio-frequency transmission line 32. Antenna feed 34 may include a positive antenna feed terminal such as positive antenna feed terminal 36 and may include a ground antenna feed terminal such as ground antenna feed terminal 38. Radio-frequency transmission line 32 may include a positive signal conductor such as signal conductor 40 that is coupled to positive antenna feed terminal 36. Radio-frequency transmission line 32 may include a ground conductor such as ground conductor 42 that is coupled to ground antenna feed terminal 38.

Radio-frequency transmission line 32 may include a coaxial cable, a coaxial probe realized by metalized vias, a microstrip transmission line, a stripline transmission line, an edge-coupled microstrip transmission line, an edge-coupled stripline transmission lines, a waveguide structure, combinations of these, etc. Multiple types of transmission lines may be used to form the transmission line path that couples millimeter/centimeter wave transceiver circuitry 28 to antenna feed 34. Filter circuitry, switching circuitry, impedance matching circuitry, phase shifter circuitry, amplifier circuitry, and/or other circuitry may be interposed on radio-frequency transmission line 32, if desired.

Radio-frequency transmission lines in device 10 may be integrated into ceramic substrates, rigid printed circuit boards, and/or flexible printed circuits. In one suitable arrangement, radio-frequency transmission lines in device 10 may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

Figure 5:
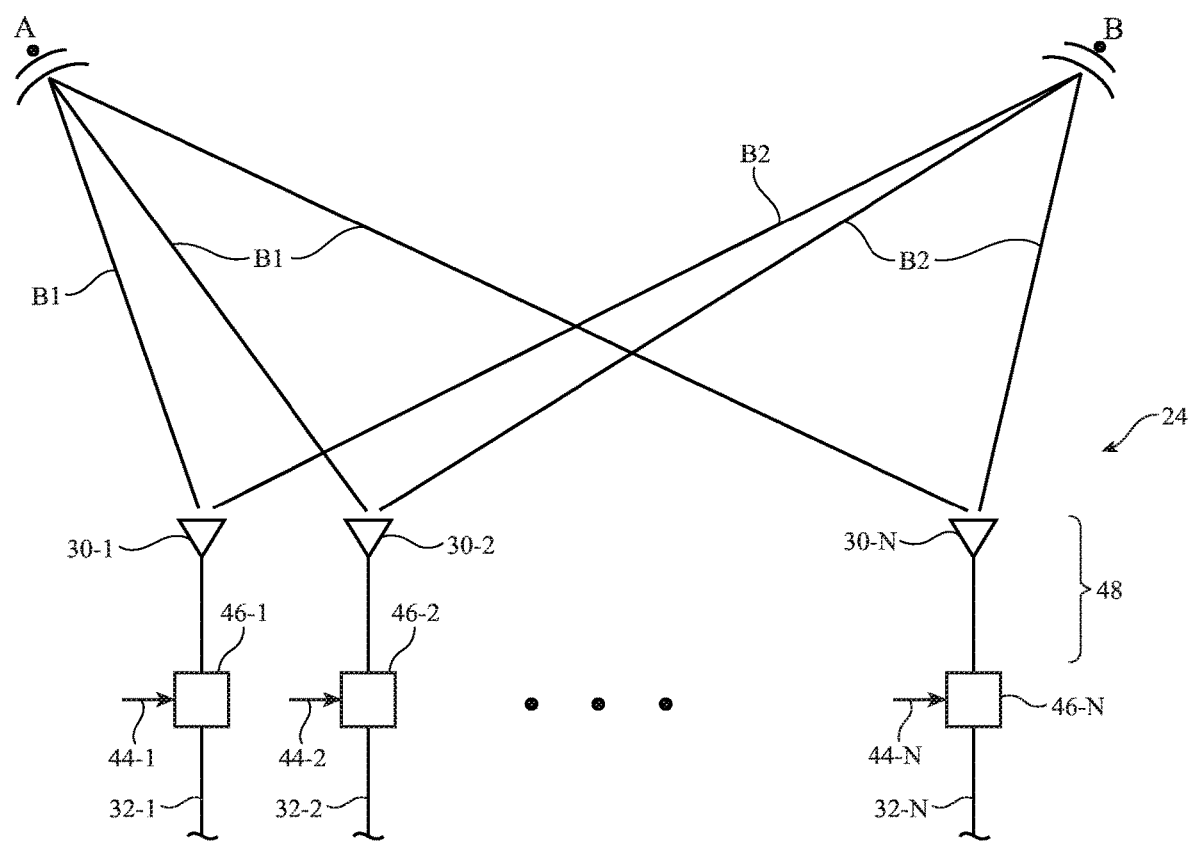
FIG. 5 is a diagram of an illustrative phased antenna array that may be adjusted using control circuitry to direct a beam of signals in accordance with some embodiments.

FIG. 5 shows how antennas 30 for handling radio-frequency signals at millimeter and centimeter wave frequencies may be formed in a phased antenna array. As shown in FIG. 5, phased antenna array 48 (sometimes referred to herein as array 48, antenna array 48, or array 48 of antennas 30) may be coupled to radio-frequency transmission lines 32. For example, a first antenna 30-1 in phased antenna array 48 may be coupled to a first radio-frequency transmission line 32-1, a second antenna 30-2 in phased antenna array 48 may be coupled to a second radio-frequency transmission line 32-2, an Nth antenna 30-N in phased antenna array 48 may be coupled to an Nth radio-frequency transmission line 32-N, etc. While antennas 30 are described herein as forming a phased antenna array, the antennas 30 in phased antenna array 48 may sometimes also be referred to as collectively forming a single phased array antenna.

Antennas 30 in phased antenna array 48 may be arranged in any desired number of rows and columns or in any other desired pattern (e.g., the antennas need not be arranged in a grid pattern having rows and columns). During signal transmission operations, radio-frequency transmission lines 32 may be used to supply signals (e.g., radio-frequency signals such as millimeter wave and/or centimeter wave signals) from millimeter/centimeter wave transceiver circuitry 28 (FIG. 4) to phased antenna array 48 for wireless transmission. During signal reception operations, radio-frequency transmission lines 32 may be used to convey signals received at phased antenna array 48 (e.g., from external wireless equipment or transmitted signals that have been reflected off of external objects) to millimeter/centimeter wave transceiver circuitry 28 (FIG. 4).

The use of multiple antennas 30 in phased antenna array 48 allows beam steering arrangements to be implemented by controlling the relative phases and magnitudes (amplitudes) of the radio-frequency signals conveyed by the antennas. In the example of FIG. 5, antennas 30 each have a corresponding radio-frequency phase and magnitude controller 46 (e.g., a first phase and magnitude controller 46-1 interposed on radio-frequency transmission line 32-1 may control phase and magnitude for radio-frequency signals handled by antenna 30-1, a second phase and magnitude controller 46-2 interposed on radio-frequency transmission line 32-2 may control phase and magnitude for radio-frequency signals handled by antenna 30-2, an Nth phase and magnitude controller 46-N interposed on radio-frequency transmission line 32-N may control phase and magnitude for radio-frequency signals handled by antenna 30-N, etc.).

Phase and magnitude controllers 46 may each include circuitry for adjusting the phase of the radio-frequency signals on transmission lines 32 (e.g., phase shifter circuits) and/or circuitry for adjusting the magnitude of the radio-frequency signals on transmission lines 32 (e.g., power amplifier and/or low noise amplifier circuits). Phase and magnitude controllers 46 may sometimes be referred to collectively herein as beam steering circuitry (e.g., beam steering circuitry that steers the beam of radio-frequency signals transmitted and/or received by phased antenna array 48).

Phase and magnitude controllers 46 may adjust the relative phases and/or magnitudes of the transmitted signals that are provided to each of the antennas in phased antenna array 48 and may adjust the relative phases and/or magnitudes of the received signals that are received by phased antenna array 48. Phase and magnitude controllers 46 may, if desired, include phase detection circuitry for detecting the phases of the received signals that are received by phased antenna array 48. The term "beam" or "signal beam" may be used herein to collectively refer to wireless signals that are transmitted and received by phased antenna array 48 in a particular direction. The signal beam may exhibit a peak gain that is oriented in a particular pointing direction at a corresponding pointing angle (e.g., based on constructive and destructive interference from the combination of signals from each antenna in the phased antenna array). The term "transmit beam" may sometimes be used herein to refer to radio-frequency signals that are transmitted in a particular direction whereas the term "receive beam" may sometimes be used herein to refer to radio-frequency signals that are received from a particular direction.

If, for example, phase and magnitude controllers 46 are adjusted to produce a first set of phases and/or magnitudes for transmitted radio-frequency signals, the transmitted signals will form a transmit beam as shown by beam B1 of FIG. 5 that is oriented in the direction of point A. If, however, phase and magnitude controllers 46 are adjusted to produce a second set of phases and/or magnitudes for the transmitted signals, the transmitted signals will form a transmit beam as shown by beam B2 that is oriented in the direction of point B. Similarly, if phase and magnitude controllers 46 are adjusted to produce the first set of phases and/or magnitudes, radio-frequency signals (e.g., radio-frequency signals in a receive beam) may be received from the direction of point A, as shown by beam B1. If phase and magnitude controllers 46 are adjusted to produce the second set of phases and/or magnitudes, radio-frequency signals may be received from the direction of point B, as shown by beam B2.

Each phase and magnitude controller 46 may be controlled to produce a desired phase and/or magnitude based on a corresponding control signal 44 received from control circuitry 14 of FIG. 3 (e.g., the phase and/or magnitude provided by phase and magnitude controller 46-1 may be controlled using control signal 44-1, the phase and/or magnitude provided by phase and magnitude controller 46-2 may be controlled using control signal 44-2, etc.). If desired, control circuitry 14 may actively adjust control signals 44 in real time to steer the transmit or receive beam in different desired directions over time. Phase and magnitude controllers 46 may provide information identifying the phase of received signals to control circuitry 14 if desired.

When performing spatial ranging operations using radio-frequency signals at millimeter and centimeter wave frequencies, the radio-frequency signals are conveyed over a line of sight path between phased antenna array 48 and an external object. If the external object is located at point A of FIG. 5, phase and magnitude controllers 46 may be adjusted to steer the signal beam towards point A (e.g., to steer the pointing direction of the signal beam towards point A). Phased antenna array 48 may transmit radio-frequency signals towards point A and may receive a reflected version of the transmitted signals that have reflected off of the external object at point A. Control circuitry 14 (FIG. 3) may then process the transmitted and received signals to identify a distance (range) between phased antenna array 48 and the external object at point A. Control circuitry 14 may use information about how phased antenna array 48 was steered while transmitting and receiving the radio-frequency signals to pinpoint the spatial location of the external object (e.g., to identify both the distance between phased antenna array 48 and the external object and the pointing angle of the line-of-sight path between the external object and phased antenna array 48).

Similarly, if the external object is located at point B, phase and magnitude controllers 46 may be adjusted to steer the signal beam towards point B (e.g., to steer the pointing direction of the signal beam towards point B). Phased antenna array 48 may transmit radio-frequency signals towards point B and may receive a reflected version of the transmitted signals that have reflected off of the external object at point B. These signals may both be processed to identify the position of the external object at point B. If desired, control circuitry 14 (FIG. 3) may control phase and magnitude controllers 46 to sweep over different beam directions while transmitting and receiving radio-frequency signals for performing spatial ranging operations. This may allow control circuitry 14 to identify and track the location of one or more external objects over time, even if the external objects move relative to phased antenna array 48. In the example of FIG. 5, beam steering is shown as being performed over a single degree of freedom for the sake of simplicity (e.g., towards the left and right on the page of FIG. 5). However, in practice, the beam may be steered over two or more degrees of freedom (e.g., in three dimensions, into and out of the page and to the left and right on the page of FIG. 5).

Figure 6:
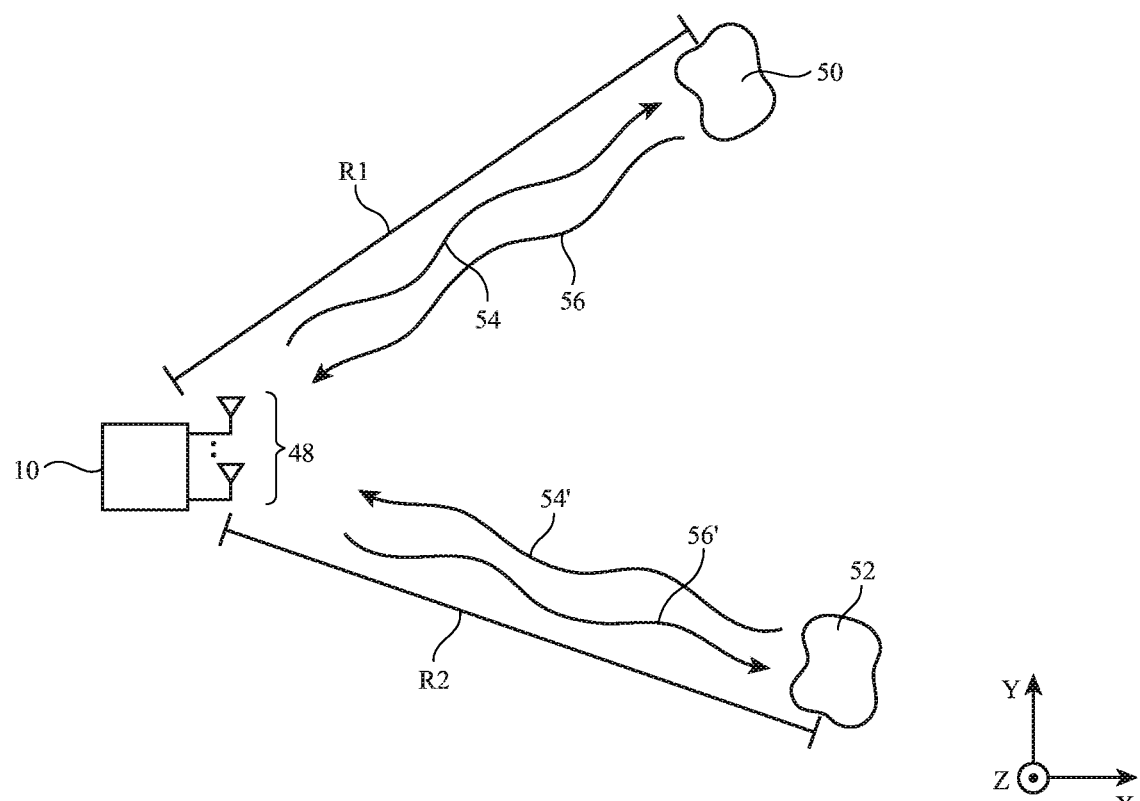
FIG. 6 is a diagram showing how an illustrative electronic device may perform spatial ranging operations using a phased antenna array and millimeter wave signals in accordance with some embodiments.
Figure 6:
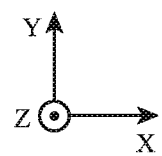

FIG. 6 is a diagram showing how device 10 may perform spatial ranging operations using radio-frequency signals at millimeter and/or centimeter wave frequencies. As shown in FIG. 6, circuitry on device 10 (e.g., millimeter/centimeter wave transceiver circuitry 28 of FIG. 3) may use one or more phased antenna arrays 48 to transmit radio-frequency ranging signals 54. Radio-frequency ranging signals 54 may be transmitted by phased antenna array 48 at a millimeter or centimeter wave frequency. Radio-frequency ranging signals 54 may include a sequence (e.g., series) of pulses or other predetermined signals at millimeter or centimeter wave frequencies (e.g., pulses that are generated based on a RADAR protocol or other range or object detection protocol).

Device 10 may then wait for receipt of a reflected version of transmitted radio-frequency ranging signals 54 that has been reflected off of an external object in the vicinity of device 10 (e.g., within a line-of-sight of device 10). In the example of FIG. 6, the transmitted radio-frequency ranging signals 54 are reflected off of external object 50 as reflected signals 56. Upon receiving reflected signals 56 using phased antenna array 48, circuitry on device 10 (e.g., control circuitry 14 of FIG. 3) may compare the transmitted radio-frequency ranging signals 54 (e.g., the sequence of pulses in the transmitted signals) to the received reflected signals 56 (e.g., the sequence of pulses in the received signals) to identify distance R1 between device 10 and external object 50. The control circuitry may identify distance R1 based on a time delay between the transmitted radio-frequency ranging signals 54 and the received reflected signals 56, as well as the known propagation speed of the signals over the air. The sequence of pulses may, for example, allow millimeter/centimeter wave transceiver circuitry 28 to identify that any given received signal is a reflected version of the transmitted radio-frequency ranging signals 54 instead of some other signal received at device 10 (e.g., because the sequence of pulses will be the same for the reflected signals as the known sequence of pulses in the transmitted radio-frequency ranging signals).

If desired, device 10 may use the known pointing angle of radio-frequency ranging signals 54 and reflected signals 56 in combination with the identified distance (e.g., distance R1) to determine the two or three-dimensional spatial location of external object 50 (e.g., X, Y, and/or Z coordinates for external object 50 in the vicinity of device 10). These operations may be repeated to track the location of external object 50 relative to device 10 over time.

If desired, device 10 may track the location of multiple external objects relative to device 10 in this manner. As shown in FIG. 6, for example, radio-frequency ranging signals 54' and reflected signals 56' may be used to identify distance R2 between device 10 and an additional external object 52. Device 10 may use the known pointing angle of radio-frequency ranging signals 54' and reflected signals 56' in combination with distance R2 to determine the spatial location of external object 52. These operations may be repeated to track the location of external object 52 over time.

In one suitable arrangement, a first set of antennas in phased antenna array 48 may be used to transmit radio-frequency ranging signals 54 and 54' and a second set of antennas in phased antenna array 48 may be used to receive reflected signals 56 and 56'. In another suitable arrangement, the same antennas may be used to both transmit the radio-frequency ranging signals and receive the reflected signals. In some scenarios, phased antenna array 48 need only operate at relatively narrow bandwidths (e.g., bandwidths less than 1 GHz). However, to optimize spatial ranging operations, it may be desirable to be able to support greater bandwidths using phased antenna array 48.

Any desired antenna structures may be used for implementing the antennas in phased antenna array 48. If care is not taken, the antennas in phased antenna array 48 may exhibit insufficient bandwidth for performing satisfactory spatial ranging operations. In one suitable arrangement that is sometimes described herein as an example, stacked patch antenna structures may be used for implementing the antennas in phased antenna array 48. The stacked patch antenna structures may allow phased antenna array 48 to exhibit sufficiently wide bandwidths for optimizing spatial ranging operations. Illustrative stacked patch antenna structures that may be used in phased antenna array 48 are shown in FIG. 7.

Figure 7:
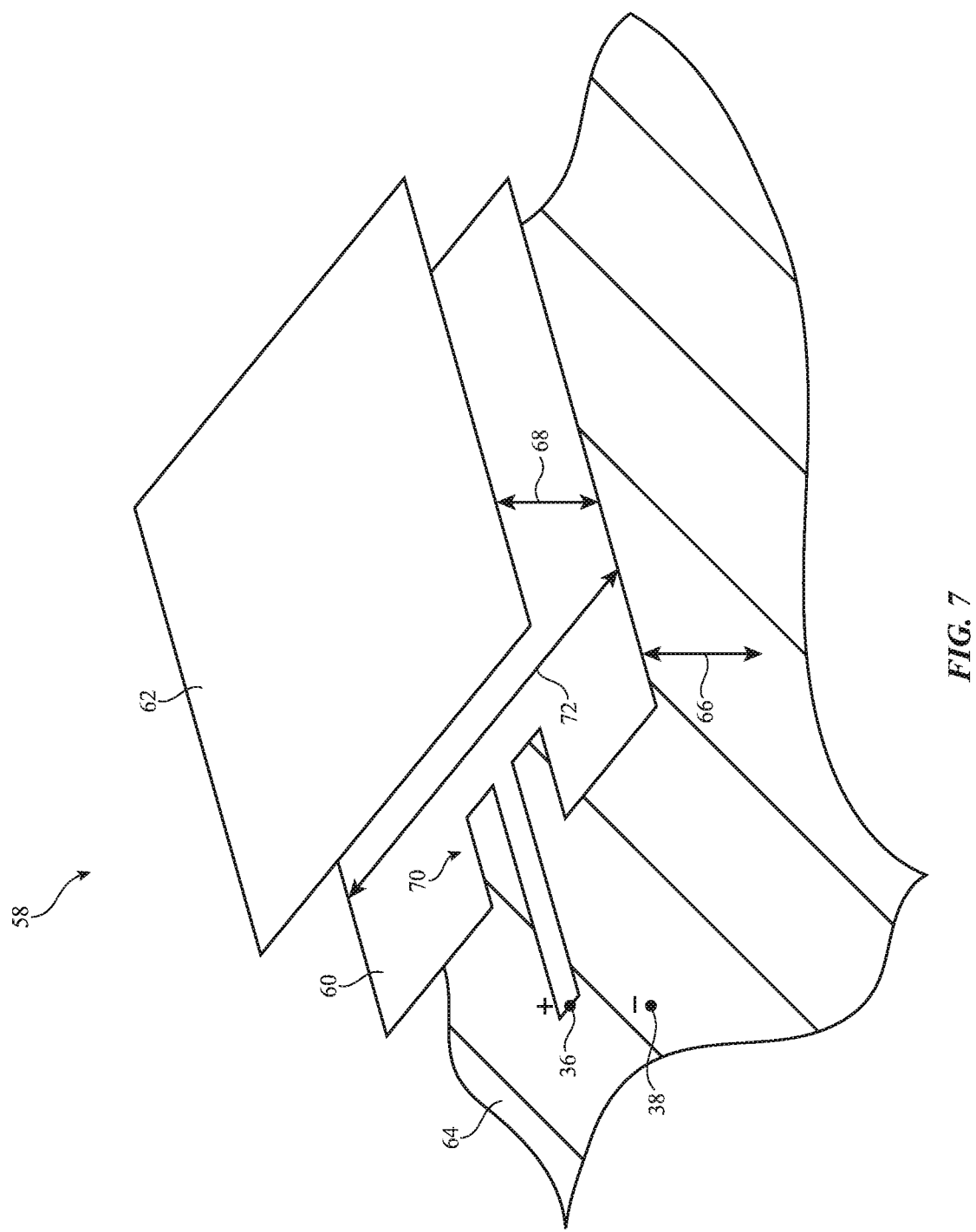
FIG. 7 is a perspective view of illustrative stacked patch antenna structures that may be provided in a phased antenna array for performing spatial ranging operations using millimeter wave signals in accordance with some embodiments.

Stacked patch antenna structures 58 of FIG. 7 may be used to form each antenna 30 (FIGS. 3-5) of phased antenna array 48 (FIGS. 5 and 6). As shown in FIG. 7, stacked patch antenna structures 58 may include a patch antenna resonating element 60 that is separated from and parallel to an antenna ground plane such as ground plane 64. Patch antenna resonating element 60 may sometimes be referred to herein as patch 60, patch element 60, patch resonating element 60, antenna resonating element 60, or resonating element 60. Ground plane 64 may lie within a plane that is parallel to the plane of patch element 60. Patch element 60 and ground plane 64 may therefore lie in separate parallel planes that are separated by a distance 66. Patch element 60 and ground plane 64 may be formed from conductive traces patterned onto a dielectric substrate such as a ceramic substrate, rigid printed circuit board substrate, or flexible printed circuit board substrate (not shown in the example of FIG. 7 for the sake of clarity).

The length of the sides of patch element 60 may be selected so that stacked patch antenna structures 58 resonate at a desired operating frequency. For example, the sides of patch element 60 may each have a length 72 that is approximately equal to half of the wavelength of the signals conveyed by stacked patch antenna structures 58 (e.g., the effective wavelength given the dielectric properties of the materials surrounding patch element 60).

The example of FIG. 7 is merely illustrative. Patch element 60 may have a square shape in which all of the sides of patch element 60 are the same length or may have a different rectangular shape. Patch element 60 may be formed in other shapes having any desired number of straight and/or curved edges. If desired, patch element 60 and ground plane 64 may have different shapes and relative orientations.

Stacked patch antenna structures 58 may be fed using positive antenna feed terminal 36 coupled to patch element 60 and ground antenna feed terminal 38 coupled to ground plane 64. A radio-frequency transmission line (e.g., radio-frequency transmission line 32 of FIG. 4) may be coupled to positive antenna feed terminal 36 and ground antenna feed terminal 38. Patch element 60 may include impedance matching notches 70 at the side of patch element 60 coupled to positive antenna feed terminal 36 (e.g., to match the impedance of patch element 60 to the impedance of the radio-frequency transmission line).

In the example of FIG. 7, stacked patch antenna structures 58 only convey radio-frequency signals using a single polarization. If desired, stacked patch antenna structures 58 may be provided with multiple feeds for covering multiple polarizations (e.g., orthogonal horizontal and vertical polarizations, circular polarizations, elliptical polarizations, etc.).

If care is not taken, patch element 60 may have insufficient bandwidth on its own for covering the entirety of a frequency band of interest (e.g., a frequency band at frequencies greater than 10 GHz). For example, in scenarios where phased antenna array 48 (FIGS. 5 and 6) is configured to cover a millimeter wave frequency band between 57 GHz and 61 GHz, patch element 60 may have insufficient bandwidth on its own to cover the entirety of the frequency range between 57 GHz and 61 GHz. In order to maximize the bandwidth of antennas 30 (FIGS. 3-5) and thus phased antenna array 48 (FIGS. 5 and 6), stacked patch antenna structures 58 may include one or more parasitic antenna resonating elements that serve to broaden the bandwidth of the antenna.

As shown in FIG. 7, a bandwidth-widening parasitic antenna resonating element such as parasitic antenna resonating element 62 may be formed from conductive structures located at a distance 68 over patch element 60. Parasitic antenna resonating element 62 may sometimes be referred to herein as parasitic resonating element 62, parasitic antenna element 62, parasitic element 62, parasitic patch 62, parasitic conductor 62, parasitic structure 62, parasitic 62, or patch 62. Parasitic element 62 is not directly fed, whereas patch element 60 is directly fed via positive antenna feed terminal 36 and ground antenna feed terminal 38. Parasitic element 62 may create a constructive perturbation of the electromagnetic field generated by patch element 60, creating a new resonance for stacked patch antenna structures 58 (e.g., parasitic element 62 may have a length that is greater or less than length 72 of patch element 60). This may serve to broaden the overall bandwidth of stacked patch antenna structures 58 (e.g., to cover the entire millimeter wave frequency band from 57 GHz to 61 GHz).

At least some or an entirety of parasitic element 62 may overlap patch element 60. If desired, parasitic element 62 may have a cross or "X" shape. In order to form the cross shape, parasitic element 62 may include notches or slots formed by removing conductive material from the corners of a square or rectangular metal patch. Removing conductive material from parasitic element 62 to form a cross shape may serve to adjust the impedance of patch element 60 so that the impedance of patch element 60 is matched to the corresponding radio-frequency transmission line. If desired, parasitic element 106 may have other shapes or orientations (e.g., a rectangular shape, a square shape, or other shapes having straight and/or curved edges).

If desired, stacked patch antenna structures 58 of FIG. 7 may be formed on a dielectric substrate (not shown in FIG. 7 for the sake of clarity). The dielectric substrate may be, for example, a rigid printed circuit board, a flexible printed circuit, a ceramic substrate, or other dielectric substrate. The dielectric substrate may include multiple stacked dielectric layers (e.g., multiple layers of printed circuit board substrate such as multiple layers of fiberglass-filled epoxy, multiple layers of ceramic substrate, etc.). Ground plane 64, patch element 60, and parasitic element 62 may be formed on different layers of the dielectric substrate.

Figure 8:
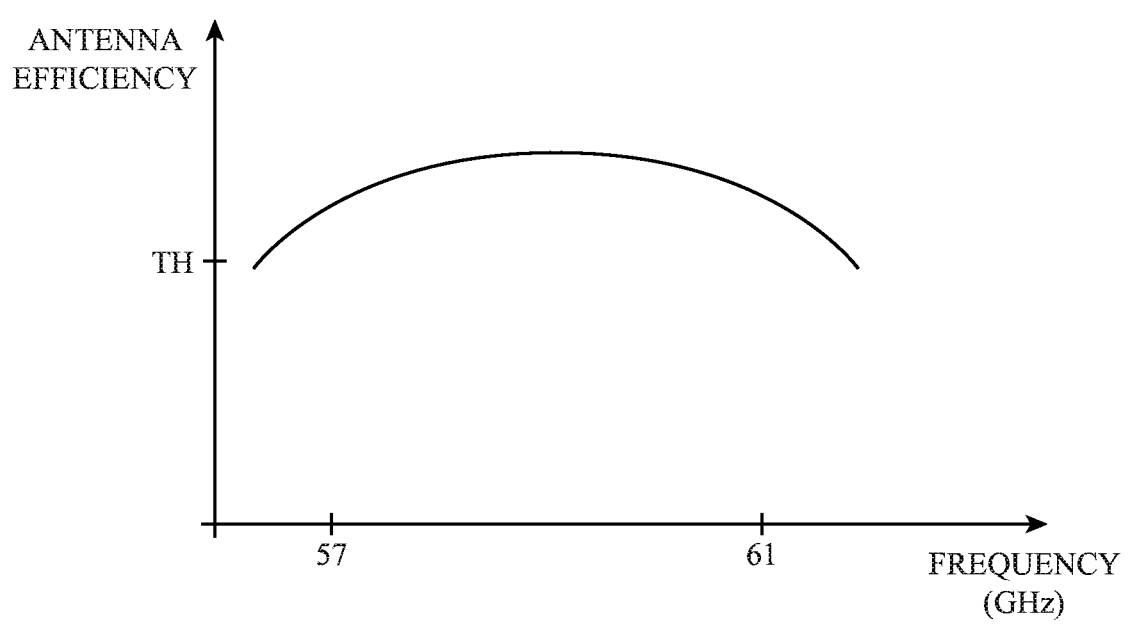
FIG. 8 is a plot of antenna performance (antenna efficiency) for illustrative stacked patch antenna structures of the type shown in FIG. 7 in accordance with some embodiments.

When configured in this way, stacked patch antenna structures 58 may cover a relatively wide millimeter wave communications band of interest such as a frequency band between 57 GHz and 61 GHz. FIG. 8 is a plot of antenna performance (antenna efficiency) as a function of frequency for antennas 30 (FIGS. 3-5) in phased antenna array 48 (FIGS. 5 and 6) that are implemented using stacked patch antenna structures 58 (FIG. 7). As shown in FIG. 8, the antennas may exhibit a relatively high bandwidth (e.g., an antenna efficiency greater than threshold efficiency TH) from a first frequency (e.g., 57 GHz) to a second frequency (e.g., 61 GHz). In the absence of parasitic element 62 of FIG. 7, the antennas will exhibit a much lower bandwidth (e.g., 1 GHz or less). In the presence of parasitic element 62 of FIG. 7, the antennas may exhibit a relatively high bandwidth (e.g., greater than 1 GHz, greater than 2 GHz, greater than 5 GHz, between 1 GHz and 5 GHz, between 1 GHz and 7 GHz, etc.). In this way, the bandwidth of the phased antenna array may be maximized to optimize the spatial ranging operations that are used to track one or more external objects relative to device 10 (e.g., external objects 50 and 52 of FIG. 6). The example of FIG. 8 is merely illustrative and, in general, the antennas may exhibit antenna efficiency curves of any desired shape extending across any desired millimeter and/or centimeter wave frequencies.

Figure 9:
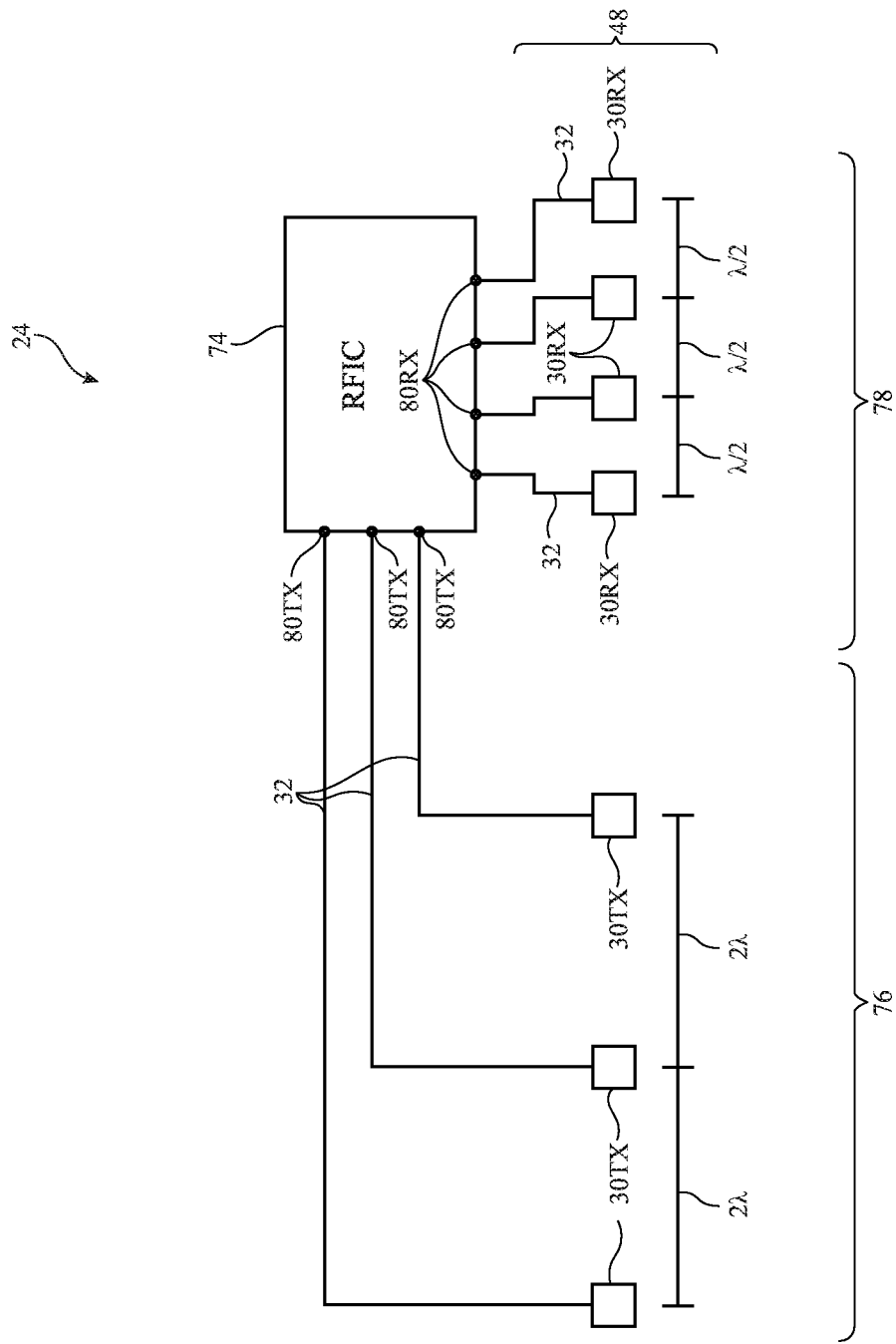
FIG. 9 is a diagram showing how an illustrative phased antenna array may include dedicated transmit and receive antennas for performing spatial ranging operations using millimeter wave signals in accordance with some embodiments.

FIG. 9 is a diagram showing how wireless circuitry 24 may use different sets of antennas in phased antenna array 48 for transmitting and receiving radio-frequency ranging signals (e.g., using a multiple-input and multiple-output (MIMO) RADAR scheme). As shown in FIG. 9, wireless circuitry 24 may include a radio-frequency integrated circuit chip (RFIC) 74. RFIC 74 may include radio-frequency components such as millimeter/centimeter wave transceiver circuitry 28 (FIG. 3) and phase and magnitude controllers 46 (FIG. 5) for phased antenna array 48.

Phased antenna array 48 may be configured to operate using a MIMO RADAR scheme. When configured in this way, phased antenna array 48 may include a set 76 of antennas 30 (FIGS. 3-5) that are used solely for transmitting radio-frequency signals (sometimes referred to herein as transmit antennas 30TX) and a set 78 of antennas 30 that are used solely for receiving radio-frequency signals (sometimes referred to herein as receive antennas 30RX). Transmit antennas 30TX and receive antennas 30RX may each be implemented using stacked patch antenna structures 58 of FIG. 7 to cover a sufficiently wide bandwidth (e.g., from 57 GHz to 61 GHz). Transmit antennas 30TX and receive antennas 30RX that have been formed using stacked patch antenna structures 58 of FIG. 7 may sometimes be referred to herein as stacked patch antennas.

Each transmit antenna 30TX may be coupled to a corresponding transmit port 80TX of RFIC 74 over respective radio-frequency transmission lines 32. RFIC 74 may include a corresponding phase and magnitude controller 46 (FIG. 5) coupled to each transmit port 80TX. Each receive antenna 30RX may be coupled to a corresponding receive port 80RX of RFIC 74 over respective radio-frequency transmission lines 32. RFIC 74 may include a corresponding phase and magnitude controller 46 (FIG. 5) coupled to each receive port 80RX. In one suitable arrangement that is described herein as an example, set 76 includes three transmit antennas 30TX whereas set 78 includes four receive antennas 30RX. This is merely illustrative and, if desired, other numbers of transmit and receive antennas may be used.

Each transmit antenna 30TX in set 76 may be separated from one or more adjacent (neighboring) transmit antennas 30TX in set 76 by distance 2λ. Distance 2λ may be twice the wavelength of operation λ of phased antenna array 48 (e.g., where the wavelength of operation λ is an effective wavelength of operation that is modified from a corresponding free space wavelength by the dielectric constant of the substrate used in forming phased antenna array 48). The wavelength of operation λ may be selected to lie at the center of the frequency band covered by phased antenna array 48 or at any other desired frequencies within the frequency band covered by phased antenna array 48 (e.g., wavelength of operation λ may be selected to correspond with any desired frequency between 57 GHz and 61 GHz).

Each receive antenna 30RX in set 78 may be separated from one or more adjacent receive antennas 30RX in set 78 by distance λ/2 (e.g., half the wavelength of operation of phased antenna array 48 or one-quarter of the distance separating transmit antennas 30TX). Configuring phased antenna array 48 in this way may, for example, allow RFIC 74 to convolve the signals received by receive antennas 30RX to produce a virtual array of receive antennas having more receive antennas than are physically present in phased antenna array 48. This may, for example, optimize the spatial resolution obtained by phased antenna array 48 given the fixed physical size of phased antenna array 48.

Wireless circuitry 24 may perform spatial ranging operations. For example, RFIC 74 may transmit radio-frequency ranging signals (e.g., radio-frequency ranging signals 54 or 54' of FIG. 6) over transmit ports 80TX and transmit antennas 30TX. Corresponding reflected signals (e.g., reflected signals 56 or 56' of FIG. 6) may be received by RFIC 74 over receive antennas 30RX and receive ports 80RX. Control circuitry 14 (FIG. 3) may process the transmitted and received signals to identify and track the location of one or more external objects (e.g., external objects 50 and 52 of FIG. 6) relative to device 10. Forming transmit antennas 30TX and receive antennas 30RX using stacked patch antenna structures 58 of FIG. 7 (e.g., configuring phased antenna array 48 to operate at a bandwidth greater than 1 GHz) may, for example, limit undesirable tilting of the boresight beam of phased antenna array 48 as frequency is changed relative to scenarios where phased antenna array 48 has a bandwidth less than 1 GHz.

Figure 10:
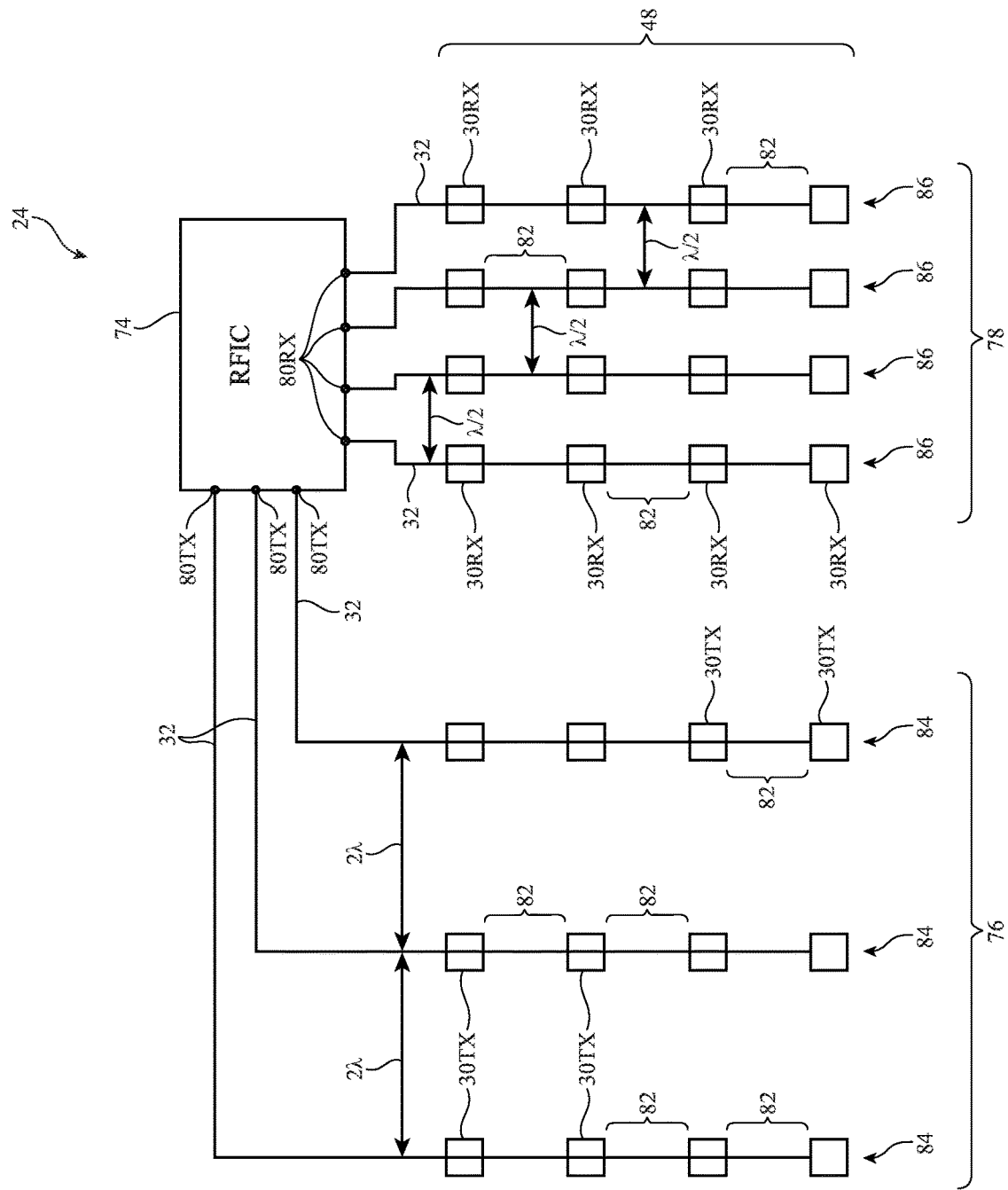
FIG. 10 is a diagram showing how an illustrative phased antenna array may include columns of multiple, in-phase, transmit and receive antennas for performing spatial ranging operations using millimeter wave signals in accordance with some embodiments.

Because transmit antennas 30TX and receive antennas 30RX of FIG. 9 are all formed within a single row of phased antenna array 48, the beam of signals handled by phased antenna array 48 may be relatively wide. In order to further focus (narrow) the beam of signals, phased antenna array 48 may include columns of multiple, in-phase, transmit antennas 30TX and columns of multiple, in-phase, receive antennas 30RX. FIG. 10 is a diagram showing how phased antenna array 48 may include columns of multiple, in-phase, transmit antennas 30TX and columns of multiple, in-phase, receive antennas 30RX.

As shown in FIG. 10, each transmit antenna 30TX may be located in a corresponding column 84 of in-phase transmit antennas 30TX. Similarly, each receive antenna 30RX may be located in a corresponding column 86 of in-phase receive antennas 30RX. In the example of FIG. 10, each column 84 of transmit antennas 30TX includes four transmit antennas 30TX and each column 86 of receive antennas 30RX includes four receive antennas 30RX. This is merely illustrative and, in general, columns 86 and 84 may include any desired number of antennas.

Each column 84 of transmit antennas 30TX may be coupled to the same transmit port 80TX of RFIC 74 over the same (shared) radio-frequency transmission line 32. Similarly, each column 86 of receive antennas 30RX may be coupled to the same receive port 80RX of RFIC 74 over the same (shared) radio-frequency transmission line 32. Radio-frequency ranging signals that are transmitted over a given transmit port 80TX may be provided to each transmit antenna 30TX in the corresponding column 84 coupled to that transmit port 80TX at the same phase and magnitude (e.g., because the transmit antennas 30TX in each column 84 share the same receive port 80RX and the same phase and magnitude controller 46 of FIG. 5). Each transmit antenna 30TX may be separated from one or two adjacent transmit antennas 30TX in the same column 84 by a corresponding segment 82 of radio-frequency transmission line 32. Segments 82 may have a length that is selected so that the radio-frequency ranging signals provided to a given column 84 are in-phase at the location of each transmit antenna 30TX in that column 84. For example, segments 82 may each have a length that is approximately equal to λ/2.

Similarly, each receive antenna 30RX may be separated from one or two adjacent receive antennas 30RX in the same column 86 by a corresponding segment 82 of radio-frequency transmission line 32. Segments 82 may have a length that is selected so that the reflected signals (e.g., reflected signals 56 or 56' of FIG. 6) are provided from a given column 86 to the corresponding receive port 80RX in-phase from each receive antenna 30RX in that column 86. For example, segments 82 in set 78 of phased antenna array 48 may each have a length that is approximately equal to λ/2. By distributing transmit antennas 30TX and receive antennas 30RX across multiple rows of phased antenna array 48 in this way, the signal beam handled by phased antenna array 48 may be more focused (narrow) than in scenarios where phased antenna array 48 includes only a single row of antennas.

The foregoing is merely illustrative and various modifications can be made by those skilled in the art without departing from the scope and spirit of the described embodiments. The foregoing embodiments may be implemented individually or in any combination.

What is claimed is:

1. Apparatus comprising:
   a radio-frequency integrated circuit having transmit ports and receive ports;
   a phased antenna array comprising:
   a first set of stacked patch antennas coupled to the transmit ports, wherein the radio-frequency integrated circuit is configured to transmit millimeter wave signals using the transmit ports and the first set of stacked patch antennas, and
   a second set of stacked patch antennas coupled to the receive ports, wherein the radio-frequency integrated circuit is configured to receive millimeter wave signals using the receive ports and the second set of stacked patch antennas, each stacked patch antenna in the first and second sets of stacked patch antennas comprising a patch element and a parasitic element overlapping the patch element; and
   control circuitry configured to perform spatial ranging operations based on the transmitted and received millimeter wave signals.

2. The apparatus defined in claim 1, wherein each stacked patch antenna in the first and second sets of stacked patch antennas further comprises:
   a ground plane, the corresponding patch element of the corresponding stacked patch antenna overlapping the ground plane;
   a first antenna feed terminal coupled to the corresponding patch element of the corresponding stacked patch antenna; and
   a second antenna feed terminal coupled to the ground plane.

3. The apparatus defined in claim 2, wherein the patch element in each stacked patch antenna in the first and second sets of stacked patch antennas comprises impedance matching notches.

4. The apparatus defined in claim 2, wherein the parasitic element in each stacked patch antenna in the first and second sets of stacked patch antennas comprises a rectangular metal patch.

5. The apparatus defined in claim 4, the first and second sets of stacked patch antennas are embedded in a dielectric substrate.

6. The apparatus defined in claim 1, wherein each stacked patch antenna in the first and second sets of stacked patch antennas is configured to cover a bandwidth greater than 1 GHz.

7. The apparatus defined in claim 1, wherein each stacked patch antenna in the first and second sets of stacked patch antennas is configured to radiate in a frequency band from 57 GHz to 61 GHz.

8. The apparatus defined in claim 1, wherein each stacked patch antenna in the first and second sets of stacked patch antennas is located in a single row of the phased antenna array.

9. The apparatus defined in claim 1, wherein the first set of stacked patch antennas is arranged in a first set of columns of multiple, in-phase, stacked patch antennas, and wherein the second set of stacked patch antennas is arranged in a second set of columns of multiple, in-phase, stacked patch antennas.

10. The apparatus defined in claim 9, wherein the radio-frequency integrated circuit comprises a respective phase and magnitude controller coupled to each column in the first and second sets of columns.

11. The apparatus defined in claim 1, wherein the received millimeter wave signals comprise a reflected version of the transmitted millimeter wave signals that have been reflected off of an external object, the control circuitry being configured to track a location of the external object based on the transmitted and received millimeter wave signals.

12. The apparatus defined in claim 1, wherein each stacked patch antenna in the first set is separated from at least one other stacked patch antenna in the first set by twice an effective wavelength of operation of the phased antenna array, and each stacked patch antenna in the second set is separated from at least one other stacked patch antenna in the second set by one-half the effective wavelength of operation of the phased antenna array.

13. The apparatus defined in claim 12, wherein the first set of stacked patch antennas comprises three stacked patch antennas and the second set of stacked patch antennas comprises four stacked patch antennas.

14. An electronic device comprising:
an integrated circuit chip having transmit ports and receive ports;
a phased antenna array, wherein the phased antenna array comprises:
transmit antennas coupled to the transmit ports, wherein the transmit antennas and the transmit ports are configured to transmit millimeter wave ranging signals using a bandwidth greater than 1 GHz, and
receive antennas coupled to the receive ports, wherein the receive antennas and the receive ports are configured to receive reflected millimeter wave ranging signals using the bandwidth greater than 1 GHz, each antenna in the transmit and receive antennas comprising stacked patch antenna structures that include a patch element and a parasitic element overlapping the patch element; and
control circuitry, wherein the control circuitry is configured to perform spatial ranging operations based on the transmitted millimeter wave ranging signals and the received reflected millimeter wave ranging signals.

15. The electronic device defined in claim 14, wherein the bandwidth is greater than 2 GHz.

16. The electronic device defined in claim 15, wherein the transmit antennas and the transmit ports are configured to transmit the millimeter wave ranging signals in a frequency band comprising frequencies from 57 GHz to 61 GHz.

17. An electronic device comprising:
a phased antenna array having a first set of antennas configured to transmit radio-frequency ranging signals at a frequency greater than 10 GHz and a second set of antennas configured to receive a reflected version of the transmitted radio-frequency ranging signals, wherein each antenna in the first and second sets of antennas comprises a ground plane, a patch antenna resonating element overlapping the ground plane, and a parasitic patch overlapping the patch antenna resonating element; and
control circuitry coupled to the phased antenna array, wherein the control circuitry is configured to identify a distance between the apparatus and an external object based on the radio-frequency ranging signals transmitted by the first set of antennas and the reflected version of the transmitted radio-frequency ranging signals received by the second set of antennas.

18. The apparatus defined in claim 17, wherein each antenna in the first and second sets of antennas is configured to cover a bandwidth greater than 1 GHz, each antenna in the first set is separated from at least one other antenna in the first set by twice an effective wavelength of operation corresponding to the frequency, and each antenna in the second set is separated from at least one other antenna in the second set by one-half the effective wavelength of operation.

* * * * *